Sept. 20, 1932.  A. A. ANDERSON  1,877,784
ADJUSTABLE TRAY SUPPORT
Filed July 24, 1930
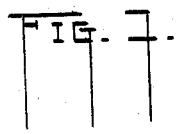
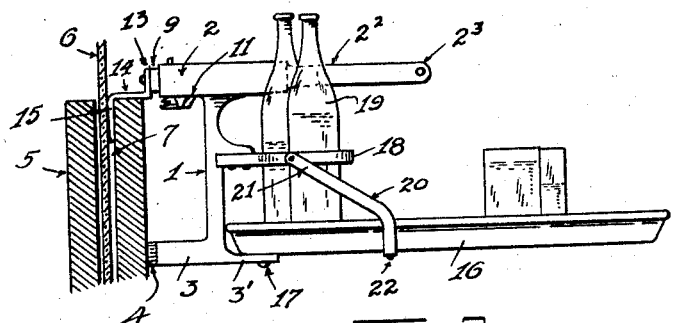
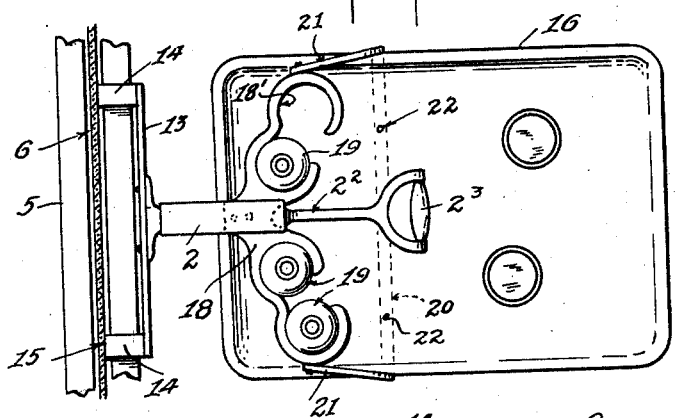
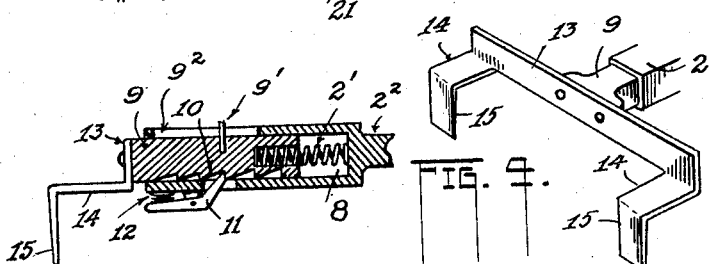
Inventor
A. A. Anderson,
By L. M. Thurlow
Attorney Patented Sept. 20, 1932

1,877,784

UNITED STATES PATENT OFFICE

ARNOLD A. ANDERSON, OF PEORIA, ILLINOIS

ADJUSTABLE TRAY SUPPORT

REISSUED

Application filed July 24, 1930. Serial No. 470,414.

This invention relates to an adjustable tray-holding or supporting device particularly for use in automobiles of the closed type.

An object of my invention is to provide a support for a tray, that may be used in closed automobiles, or those of the type having sliding windows, such tray being employed for holding refreshments.

A further object is to provide a tray-support that, while adapted for easy and ready adjustment for leveling the tray, can be supported on the door of an automobile by lodging an extension thereon within the slot or cavity of said door within which the usual glass for closing the vehicle is slidable.

To the end that my invention may be understood I have provided the appended drawing forming part hereof, wherein—

Figure 1 is a side elevation of said invention showing part of the door of an automobile in transverse vertical section.

Figure 2 is a plan of the same.

Figure 3 is a longitudinal section of a pawl and ratchet-bar arrangement for leveling purposes, and Figure 4 shows part of the device of my invention, a portion of which is adapted for lodgement upon a door within the glass-slot thereof.

My device, which, while as in others of this nature has means for leveling a tray, is so arranged that it can be used within an automobile of the closed type, it being especially desirable for use in this type since when the weather is such that it is uncomfortable to have the windows open, as in the case of rain or cold, said windows may all be closed including that of the door from which the tray support extends.

In the figures, 1 designates a member which in use has an upright position, there being at its upper end a member 2 and at its lower end an arm 3, each of which lies substantially at right angles to said member 1. The arm 3 preferably carries a rubber or other soft foot 4 to abut the inner side of the automobile door designated at 5 which door includes the usual slidable glass 6 to move within the customary slot or cavity 7.

The member 2 is provided with a cavity 8 paralleling its length which is preferably rectangular, not shown, and receives a bar 9 provided with ratchet teeth 10 in one of its surfaces, said bar being adapted to slide within the said cavity 8 in a direction at right angles to the plane of the door 5. Said cavity has therein a spring 2' compressed between a wall of the member 2 and one end of the said bar 9, said spring tending to push the latter outward, said bar being limited in that movement, however, by means of a pin 9', for example, held therein which may play within a slot $9^2$ of the member 2. In addition, that latter is extended at $2^2$ and has a suitable hand-grip $2^3$. Pivotally mounted in suitable manner on the member 2 is a pawl 11 which by means of a spring 12 is adapted to be held in engagement with a tooth of the said bar 9. One end of the latter carries a cross-bar 13 including one or more fingers 14 each having a comparatively thin extension 15 that may be slightly wedge-shaped if desired and adapted to enter the slot 7 of the door between the inner panel of the same and the glass 6 as shown in Figure 1.

The lower end of the upright member 1 has an extension 3' acting as a support for one end of a tray 16 and connected by means of screws or rivets 17, for example. Above the extension 3' is a portion 18 which may be either secured to the member 1 or form part thereof. Said portion 18 constitutes a bottle-rack and may preferably extend at right angles to the length of the member 2 as in Figure 2, and substantially parallel to the plane of the tray. It is provided with one or more openings or recesses 18' which form receptacles for bottles 19, it being noted that in transporting the whole structure from place to place the bottles cannot be overturned.

As a further support for the tray a bail 20 may pass under said tray, the extensions 21 thereof being suitably attached to the portion 18, and preferably said bail may be affixed in any good manner to said tray, as at 22 for example.

The whole affair may be transported to and from the vehicle and the refreshment station and one hand of the attendant may grasp the tray while the other may use the grip $2^3$.

Due to the fact that the automobile may be tilted from a level position, depending upon the slope of the road surface upon which it stands, and that there may be variations in different makes of vehicles in the angle of tilt of their doors with respect to a vertical line it is quite necessary to provide for an adjustment of the tray support to the end that the tray may always be properly leveled. Of importance, also, is the fact that not all automobiles are furnished with the same types of fitting for their doors so that while a tray support might be attached or hung from some part or fitting of a door of a particular make of vehicle it might not be attachable to other makes. All vehicles of the closed type, however, are practically identical in the matter of including a door having a slot or cavity within which to adjust the glass closure of such door. Now, since my tray support is particularly adapted for vehicles of the closed type it is adaptable to any make and may be used therewith regardless of whether the glass is raised to closed position or is entirely down in the open position. That this may be possible the described thin extension or extensions 15 are provided which may be dropped into the slot or cavity 7 inside the position of the glass 6.

In placing the support in position, therefore, the extensions 15 are disposed as explained, the member 1 and the rachet-bar 9 being adjusted relatively to level the tray while the foot 4 is in abutment with the door, the pawl 11 being released as required by pressure of a finger of the hand thereon. Naturally, the pull upon the door by the weight of the support and tray will be through the member 1 and the pawl, the latter lying in abutment with one of the teeth 10.

It is to be understood that slight changes may be made in the device since it is not my intention to be confined exactly to what has been described and shown, but what I claim is:—

1. A tray support for the purpose named including in combination a tubular part including a grip portion, a foot portion spaced from both and rigid therewith, a toothed bar slidable in said part, a pawl carried by the part adapted to engage one of the teeth of said bar, a part on said bar including an extension disposed substantially at right angles to the length of the bar, a bottle rack rigid with the tubular part, and a tray below the rack and rigid with respect thereto.

2. A tray support for the purpose named including in combination a tubular part including a grip portion, a foot portion spaced from both and rigid therewith, a toothed bar slidable in said part, a pawl carried by the part adapted to engage one of the teeth of said bar, a part on said bar including an extension disposed substantially at right angles to the length of the bar, a bottle rack rigid with the tubular part, and a tray spaced from the rack and rigid with respect thereto.

3. A device for the purpose named including a single unitary structure comprising an upright, a tubular part surmounting the same having a hand grip, and a foot portion at the lower end of the upright, a toothed bar slidable in the tubular part including a terminal portion at right angles to the length of said bar, a pawl on the said tubular part to engage a tooth of the bar, a tray affixed at one end of the upright, and a bottle-rack disposed between the tray and tubular part and lying in a position transverse to the length of the tray.

4. In combination with the door of an automobile, a structure comprising a ratchet-bar having at one end a hook-portion to engage over the top of said door, a part to receive the bar into it at one end, said part having a hand grip at its other end, a pawl carried by the part engageable with a tooth of said bar, a foot-portion spaced from said part and rigid therewith adapted to abut that side of the door from which said ratchet-bar projects, a bottle rack carried by the described structure rigid with respect to the said part, a tray secured at one end to the foot portion beneath and spaced from the rack, and a bracing member extending from the rack and secured to the tray outward from the supported end thereof.

In testimony whereof I affix my signature.

ARNOLD A. ANDERSON.